(Model.) 3 Sheets—Sheet 1.

M. PÜSCHNER.
Machine for Making Elbow Pipe.

No. 232,368. Patented Sept. 21, 1880.

Witnesses:
Henry Van Blarcom
John F. Allen

Inventor:
Moritz Püschner
per Henry E. Roeder
attorney

N. PETERS, PHOTO-LITHOGRAPHER, WASHINGTON, D.C.

(Model.)
3 Sheets—Sheet 2.
M. PÜSCHNER.
Machine for Making Elbow Pipe.
No. 232,368. Patented Sept. 21, 1880.
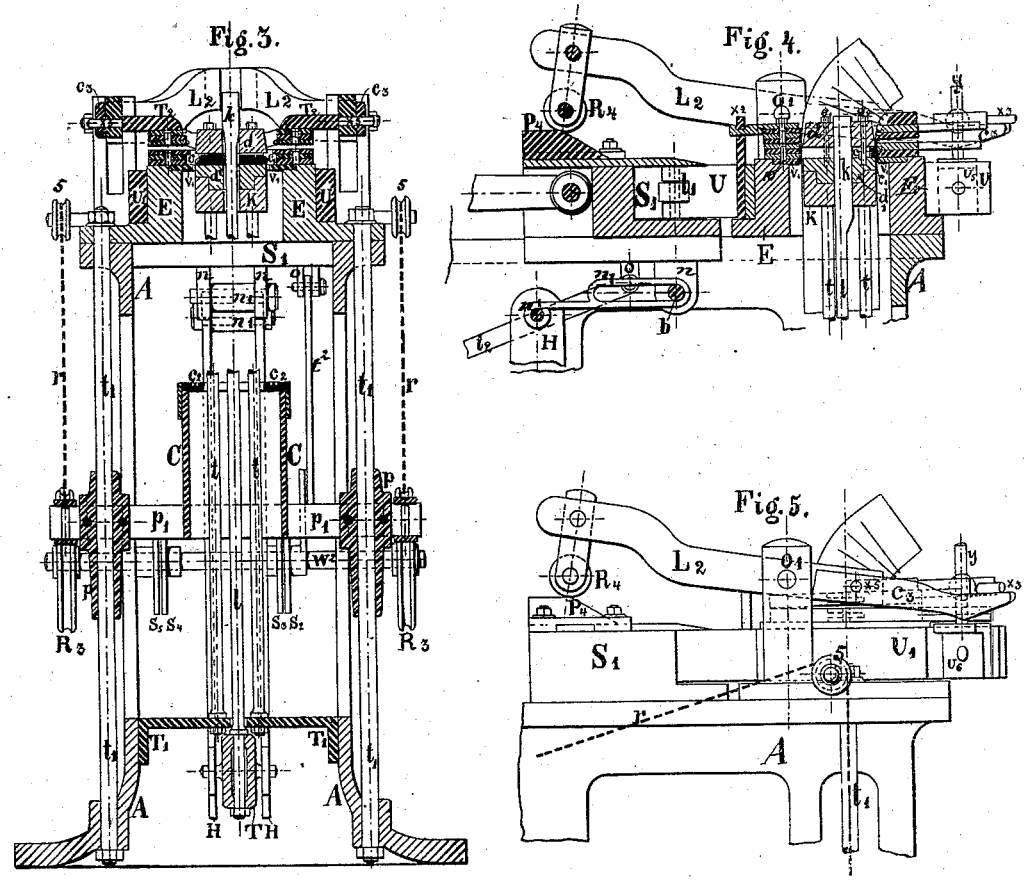
Witnesses:
Inventor.

(Model.)
M. PÜSCHNER.
Machine for Making Elbow Pipe.
No. 232,368. Patented Sept. 21, 1880.
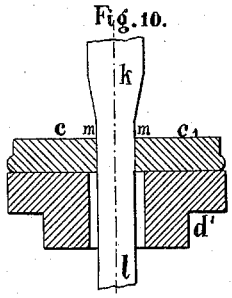
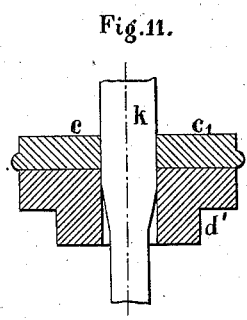
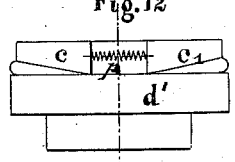
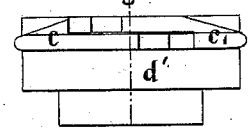
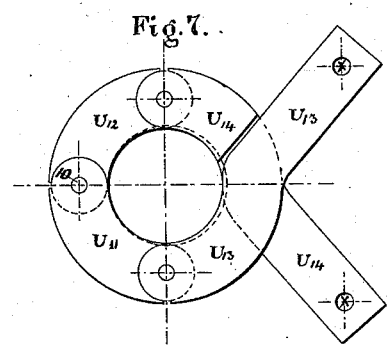
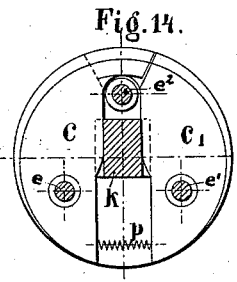
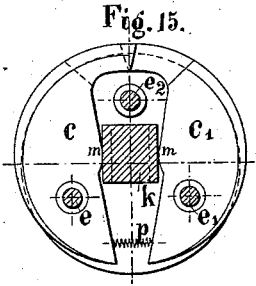
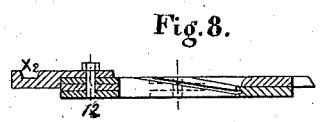
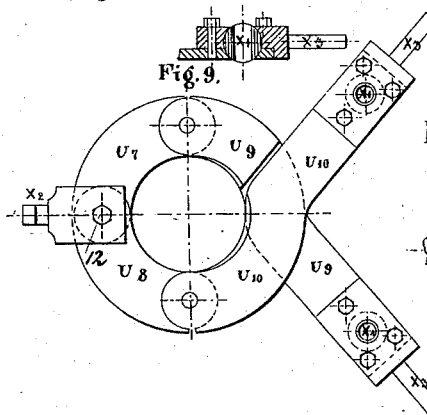
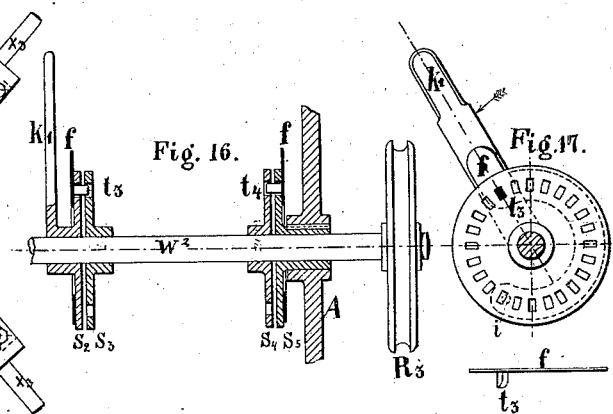
Witnesses:
Henry Van Blarcom
John F. Allen
Inventor.
Moritz Püschner
per Henry E. Roeder
attorney
N. PETERS, PHOTO-LITHOGRAPHER, WASHINGTON, D. C.

UNITED STATES PATENT OFFICE.

MORITZ PÜSCHNER, OF GÖRLITZ, PRUSSIA, GERMANY.

MACHINE FOR MAKING ELBOW-PIPES.

SPECIFICATION forming part of Letters Patent No. 232,368, dated September 21, 1880.

Application filed March 31, 1880. (Model.) Patented in Belgium October 31, 1879, and in France January 2, 1880.

*To all whom it may concern:*

Be it known that I, MORITZ PÜSCHNER, of Görlitz, Prussia, German Empire, have invented new and useful Improvements in Machines for Manufacturing Sheet-Metal Elbow-Tubes, which have been patented in France, No. 133,164, dated January 2, 1880, and in Belgium, No. 49,592$^B$, dated October 31, 1879, and of which the following is a specification.

My invention relates to improvements in machines for manufacturing sheet-metal elbow-tubes from one piece of sheet-iron by forming folds at the outer surface of the tube, while the inner surfaces remain completely plain; and the object of my improvements is to unite within one machine the work done heretofore by means of several separately-working machines used for the manufacture of sheet-metal elbow-tubes—that is to say, I unite the action of provisional pressuring or bulging and the action of flattening the bulged folds and the formation of the elbow within the automatical work done by one machine, and in such a manner that the straight tube in its cylindrical form enters into this new machine, and the finished elbow-tube is delivered from it. I attain this purpose by the mechanism illustrated in the accompanying sheets of drawings, in which—

Figure 1:
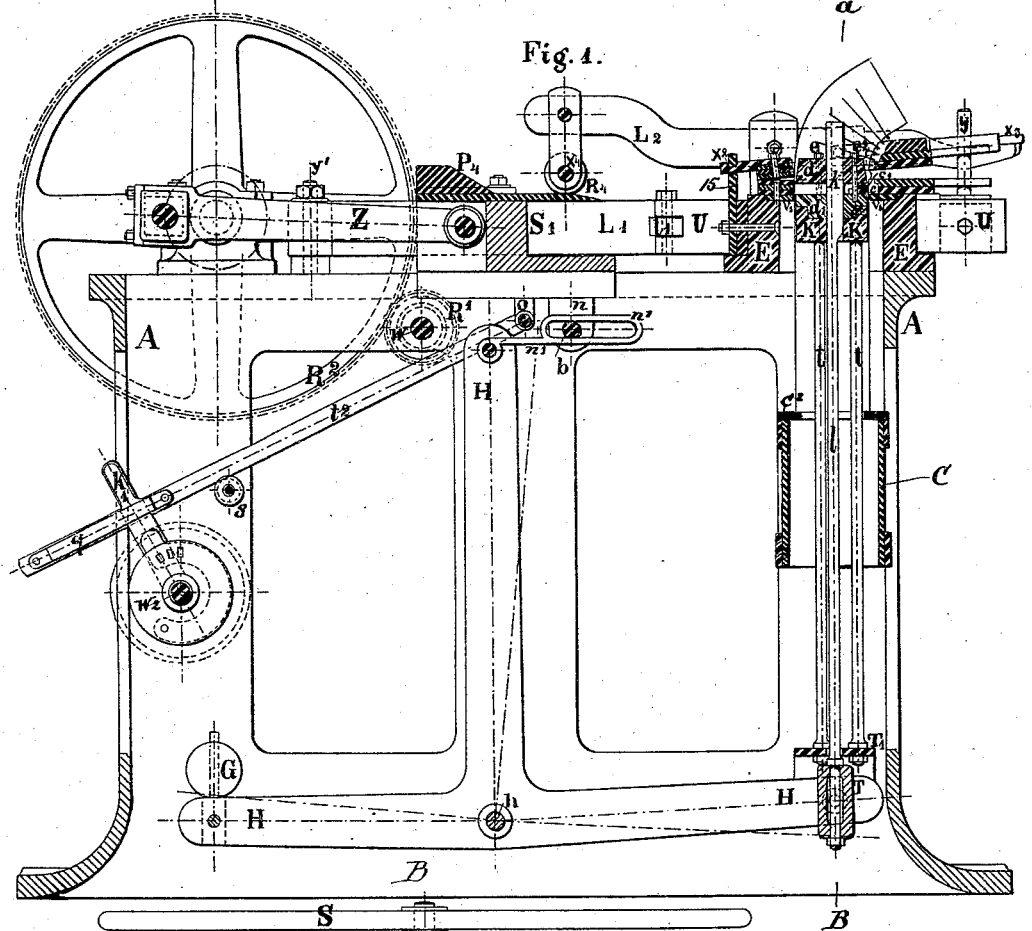
Figure 2:
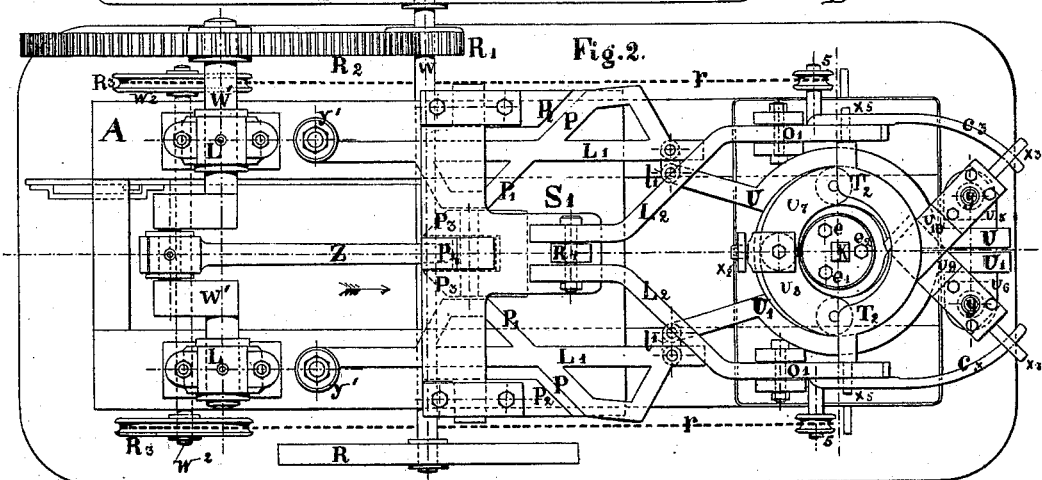

Figure 1 shows a vertical section. Fig. 2 is a plan of the complete machine. Fig. 3 is a vertical section at the line $a$ B in Fig. 1. Fig. 4 is a longitudinal section of the tools. Fig. 5 is a side view of the parts shown in section in Fig. 4. Figs. 6 to 17 show the different detail pieces.

Similar letters refer to similar parts in all the figures.

The complete mechanism is arranged on a suitable frame, A, and is divided in two principal groups: first, the mechanism of movement; second, the mechanism of the tools. The first consists of a shaft, W with pulley R and fly-wheel S. From shaft W the motion is transmitted, by the pinion R' and the wheel R$^2$, to the cranked shaft W' and the connecting-rod Z, whereby the slide S', of a peculiar construction, is set in motion, which influences the tools and executes, consequently, the complete operation.

The operation is divided in three separate parts: first, the bulging of the folds; second, the flattening of the previously-prepared bulging, and, third, the raising of the tube for the height of one bulging to allow a new bulging while the previous one is flattened.

The slide S' is provided at its lower surface with small lugs $n$ and bolt $b$, connected to the levers H H by the connecting-link $n'$. These levers H oscillate upon the shaft $h$. The arms of the levers H are provided at one side with the counter-weight G, while the ends of the other horizontal arms are connected to the cross-piece T, to which the rod $l$ is attached, provided with a head, $k$, of rectangular section and conical at its lower part.

The geometrical axis of the rod $l$ coincides with that of the heart-block K, supporting the tools for executing the bulging of the tube by means of the head $k$ of the rod $l$. The heart-block K is supported by three rods, $t\ t\ t$, fixed to the cross-piece T', attached to the frame A, and supports the tappets $c\ c'$, constructed in two parts, like shears, as represented by Figs. 10 to 15, inclusive, in closed and open position.

The two tappets $c\ c'$ turn around the bolts $e$ and $e'$, while their vertical position is assured by two disks, $d'$ and $d$. The lower one, $d'$, is attached through a suitable screw to the heart-block K, and is connected to the upper one, $d$, by the bolts $e$, $e'$, and $e^2$. The upper disk, $d$, is of a conical section.

The tappets $c$ and $c'$ are opened when the rod $l$ and its head $k$ are moved downward through the heart-block K by means of the levers H as soon as the conical lower part of $k$ arrives at the projecting points $m\ m$, and the proper form of the tappets causes a bulging of the tube, diminishing proportionally from one side to the other. After the formation of the first bulging the tube must be elevated for a second bulging and flattening of the previous bulging in the same moment.

To allow the necessary raising of the tube under operation, which is supported by the cross-head C, the spring $p$ is arranged, which closes the tappets $c$ and $c'$ in their first position, Fig. 14, while at the same time the rod $l$ and its head $k$ are raised by means of levers H.

Fig. 1 represents the tube during its formation supported by the cross-piece C, and it will be seen that the formation is executed by delivering the tube from out of the machine.

The top $c^2$ of the cross-piece C is provided with grooves corresponding to the different diameters of tubes, and it will be clearly understood that for the formation of tubes of a certain diameter there are tappets of corresponding size to be fitted to the machine, as well as that the different parts of the other tools will require to be of corresponding size.

The cross-piece C is guided upon the rods $t'$ $t'$ through the boxes $p$ $p$, attached to the outer ends, $p'$ $p'$, of the cross-piece.

For raising the cross-piece C, the chains $r$ $r$ are fitted to the outer ends, $p'$ $p'$, of the cross-piece, and after having passed the small pulleys 5 5 they are rolled upon the pulleys $R^3$ on the shaft $W^2$. The rolling up of part of the chains, and consequently the raising of the cross-piece C and tube, is executed by the motion of the slide $S'$.

The rod $t^2$ is connected to the slide $S'$ by means of the small hinge-joint $o$, and to the ratchet-wheels by means of the connecting-link $q$ and crank $k'$. The rod $t^2$ is guided by the small pulley 8, and the connecting-link $q$ of the rod causes only the last part of the motion of the slide $S'$ to act upon the crank or lever $k'$ and cause the advance of the ratchet-wheels. The ratchet-wheels are represented by Figs. 16 and 17. The crank or lever $k'$, which likewise is movable by hand, is provided with the disk $s^2$ and turns freely on the shaft $W^2$. The ratchet-wheel $s^3$ is fixed to the shaft $W^2$, as well as the stop-wheel $s^4$, while the stop-wheel $s^5$ is fixed within the nave of the frame, and the shaft $W^2$ turns freely within the nave of the wheel $s^5$. The shaft $W^2$ is provided with the two chain-pulleys $R^3 R^3$, as before mentioned. To the wheels $s^2$ and $s^5$ springs $f f$ are attached by means of rivets $i i$, Fig. 17. These springs are provided at their loose ends with pawls $t^3$ and $t^4$, gearing with the corresponding holes in the wheels $s^3$ and $s^4$. The reciprocal position of the ratchet-wheels $s^3$ and $s^4$ is so arranged that in the moment of the transition of the pawl $t^3$ from out of one hole of the wheel $s^3$ into the next one the pawl $t^4$ stops the wheel $s^4$, so that any sliding of the chains at the pulleys $R^3$ is made impossible. The pitch or distance of the holes in the wheels $s^3$ and $s^4$ corresponds to the height or pitch of the bulgings or foldings of the tube.

Simultaneously with the formation of a new bulging the previous bulging is folded or flattened, as will be clearly understood by Fig. 4.

The apparatus for folding or flattening the bulgings made by the tappets $c$ and $c'$ is arranged on the pedestal E, which is closed by the disk $v'$, embracing the tube in the level of the heart-block K, and consists principally of two compressors. (Represented by Figs. 6, 7, 8, and 9.)

The lower shears consist of four cheeks, $u^{11}$ $u^{12}$ $u^{13}$ $u^{14}$, connected together by joints, and held in correct position by the joint-bolt 10 of the cheeks $u^{11}$ and $u^{12}$, which likewise passes through the disk $v'$, Fig. 4. The cheeks $u^{13}$ and $u^{14}$ are are provided at their exterior ends with holes $x$ $x$.

Around the outer surface of the cylindrical pedestal E bent levers U U', Fig. 2, are arranged, provided with lugs $u^5$ and $u^6$, bearing the vertical pivots $y$ $y$, passing through the holes $x$ $x$. The other ends of these bent levers U and U' are connected to levers L' L' by means of joint-links $l'$ $l'$. The levers L' L' turn on centers or pivots $y'$ $y'$, and are provided with inclined planes P P and P' P' on opposite sides to each other.

It will be seen that by a movement of the levers L' L' toward the center of the machine, Fig. 2, the inner ends of the levers U and U' are closed, and consequently the cheeks $u^{11}$ $u^{12}$ $u^{13}$ $u^{14}$ are likewise closed by influence of the pivots $y y$, leaving a space large enough for the bulging of the tube, and embracing with their upper parts exactly the cylindrical tube. For the formation of the aforesaid space the cheeks are correspondingly provided with a counter-sink. The lower compressor being closed, the bulging delivered previously must be folded and flattened by means of the upper shears, the latter, consisting equally of four cheeks, $u^7$, $u^8$, $u^9$, and $u^{10}$, equally connected together and closing in the same moment as the lower compressors, as they are likewise connected with the levers U and U' by means of the pivots $y$, passing through the ball-joints $x'$ $x'$ arranged in the exterior ends of cheeks $u^{10}$ and $u^9$.

Before the operation of the shears these upper compressors must be elevated to an angle with the horizontal line. For this purpose a projection, $x^2$, is attached through their joint-pin 12 to the compressors $u^7$ and $u^8$, and pivoted in the fixed stand 15, while the extensions $c^3$ $c^3$ of the levers $L^2$ $L^2$ support the exterior ends of the compressors $u^9$ and $u^{10}$ by means of the pins $x^3 x^3$, connected to the exterior ends of said compressors or to the cap-pieces of the ball-joints $x'$ $x'$.

The levers $L^2$ $L^2$ have their fulcrums in the stands O' O', and are united at their inner ends by the link $x^4$, serving as a center to the small pulley $R^4$. The other ends of the levers are provided with the extensions $c^3$ $c^3$, riveted or screwed thereon, and by the half-circular cross-piece $T^2$, oscillating around its pivots $x^5$ $x^5$.

It will be clearly understood that by raising the lever-arms with the small pulley $R^4$ the upper compressors are pressed down and the bulging is folded and flattened.

The movement of the levers L' L' and $L^2$ $L^2$ is executed by the motion of the slide S', which is provided with the inclined planes $P^2$ $P^2$ and $P^3$ $P^3$, corresponding to the inclined planes of the levers L' L', and with the incline $P^4$, corresponding to the pulley $R^4$ of the combined levers $L^2$ $L^2$.

The work done by the slide S' during its motion is as follows: When the slide is moved in the direction of the arrow, Fig. 2, the inclines P² and P² touch the inclines P and P and cause the movement of the levers L' L' inward, when the compressors begin to close. The compressors being completely closed, the bolt $b$ of the joint $n$ has arrived at the end of the link $n'$, and the pulley R⁴ at the foot of the incline P⁴. By a continued movement of the slide S' in the direction of the arrow $a$ a second bulging is executed and the flattening of the previous bulging. By a reversed motion of the slide S' the small pulley R⁴ deserts the incline P⁴, the upper compressors are raised again, the tappets C and C' are closed, the inclines P³ P³ of the slide S' touch the inclines P' P' of the levers L' L', and the levers L' L' return in their outward position, and consequently the tube is raised a pitch by means of the ratchet-wheels. By a continued repetition of this combined action of the machine an elbow-tube is completely finished and delivered from the machine in a few minutes.

What I claim as my invention, and desire to secure by Letters Patent, is—

1. The combination of slide S' with link $n$, levers H H, cross-piece T, and rod $l$, provided with head $k$, tappets $c\ c$, and actuating mechanism, substantially as and for the purpose described.

2. The cross-head C, cross-bar $p'$, chains $r\ r$, wheels R³ R³, shaft W², crank-lever $k'$, rod $t^2$, slide S', and actuating mechanism, substantially as set forth.

3. In combination with the support for the pipe and the cross-head to which said support is attached, the ratchet-wheels S³ and S⁴, the shaft W², the wheels S² and S⁵, springs $f\ f$, pawls $t^3\ t^4$, wheel S², rod $t^2$, slide S', and devices for bulging and flattening the elbow, substantially as set forth.

4. The shears $w^{11}$, $w^{12}$, $w^{13}$, and $w^{14}$ and the compressors $u^7$, $u^8$, $u^9$, and $u^{10}$, in combination with the levers U U' and means for operating said levers, latter being provided with vertical pivots $y\ y$ and connected to said compressors, in the manner and for the purpose set forth.

5. The levers L² L² and means for operating the same, with extensions $c^3\ c^3$, and the half-circular cross-piece T², in combination with the shears $u^7$, $u^8$, $u^9$, and $u^{10}$, pivoted through their projection $x^2$ in the stand 15, arranged to operate in the manner and for the purpose substantially as described.

6. The levers L' L', with inclined surfaces P P and P' P', and connected with the levers U U', and the levers L² L², with roller R⁴, in combination with actuating mechanism, and the slide S', provided with inclined surfaces P², P², P³, P³, and P⁴, in the manner and for the purpose substantially as described.

MORITZ PÜSCHNER.

Witnesses:
WILHELM MORITZ,
WILHELM SCHILG.